United States Patent
Chang et al.

(10) Patent No.: US 7,219,177 B2
(45) Date of Patent: May 15, 2007

(54) METHOD AND APPARATUS FOR CONNECTING BUSES WITH DIFFERENT CLOCK FREQUENCIES BY MASKING OR LENGTHENING A CLOCK CYCLE OF A REQUEST SIGNAL IN ACCORDANCE WITH THE DIFFERENT CLOCK FREQUENCIES OF THE BUSES

(75) Inventors: Hen-Kai Chang, Hsinchu (TW); Chung-Wen Kao, Hsinchu (TW); Chih-Chieh Chuang, Hsinchu (TW); Chun-Nan Li, Hsinchu (TW); Te-Tsoung Tsai, Hsinchu (TW); Hsi-Yuan Wang, Hsinchu (TW)

(73) Assignee: Winbond Electronics Corp., Hsinchu (TW)

( * ) Notice: Subject to any disclaimer, the term of this patent is extended or adjusted under 35 U.S.C. 154(b) by 157 days.

(21) Appl. No.: 10/904,676

(22) Filed: Nov. 23, 2004

(65) Prior Publication Data
US 2006/0112205 A1 May 25, 2006

(51) Int. Cl.
*G06F 1/12* (2006.01)
(52) U.S. Cl. .................... 710/110; 710/58; 710/60; 710/310; 713/400; 713/501
(58) Field of Classification Search ........ 710/104–110, 710/306–313, 58–61; 713/400–401, 500–503
See application file for complete search history.

(56) References Cited

U.S. PATENT DOCUMENTS

| | | | | |
|---|---|---|---|---|
| 5,727,171 | A  * | 3/1998 | Iachetta, Jr. | 710/107 |
| 6,021,451 | A  * | 2/2000 | Bell et al. | 710/309 |
| 6,810,460 | B1 * | 10/2004 | Kirkwood | 710/306 |
| 6,857,037 | B2 * | 2/2005 | Messmer et al. | 710/300 |
| 6,981,088 | B2 * | 12/2005 | Holm et al. | 710/306 |
| 7,000,045 | B2 * | 2/2006 | Holm et al. | 710/110 |
| 2002/0162043 | A1 | 10/2002 | Messmer et al. | 713/500 |
| 2004/0122994 | A1 * | 6/2004 | Hammitt et al. | 710/36 |

* cited by examiner

*Primary Examiner*—Mark H. Rinehart
*Assistant Examiner*—Raymond N Phan
(74) *Attorney, Agent, or Firm*—Jiang Chyun IP Office

(57) ABSTRACT

A method and an apparatus in a computer system for connecting buses with different clock frequencies are provided. The method comprises receiving a request transmitted from a master to a slave. If the clock frequency of the master is lower than that of the slave such that the slave sees more requests than the master does, redundant cycles of the request signal are masked lest the slave repeatedly receive the request. The request is then transferred to the slave. If the clock frequency of the master is higher than that of the slave such that the slave cannot receive the request in time, then the request signal is lengthened so that the request signal is synchronized with the clock cycles of the slave. The output data responded from the slave is then transferred to the master.

14 Claims, 11 Drawing Sheets

METHOD AND APPARATUS FOR CONNECTING BUSES WITH DIFFERENT CLOCK FREQUENCIES BY MASKING OR LENGTHENING A CLOCK CYCLE OF A REQUEST SIGNAL IN ACCORDANCE WITH THE DIFFERENT CLOCK FREQUENCIES OF THE BUSES

BACKGROUND OF THE INVENTION

1. Field of the Invention

The present invention relates to a method and an apparatus for connecting buses of a computer system, and more particularly to a method and an apparatus for connecting buses with different clock frequencies.

2. Description of the Related Art

In computer systems, buses are very important devices. With buses, the essential components of computer systems, such as central processing units (CPU), memories and peripheral devices, are able to communicate with each other. Devices connected to buses include master devices and slave devices. Master devices, such as CPU, transmit requests. Slave devices, like peripheral devices, execute requests. The function of buses is to transfer requests and responses of requests.

Buses are shared by all devices so they tend to become the bottleneck during data transmission. Only one master can use the bus at one time. The other masters can only transmit requests after the execution of the previous request is completed. Accordingly, one solution is to put multiple buses in the system such that requests transmitted from masters connected to different buses can be simultaneously and individually executed on different buses. For example, the advanced high-performance system bus (AHB) proposed by ARM Corp. is one such solution.

These buses must be able to communicate to each other, which is made possible by a transfer matrix in the multi-layer AHB. A transfer matrix is a conversion interface among buses, in which a master of a bus can use a slave of another bus without affecting the operation of other buses.

The specifications of the multi-layer AHB, however, do not mention the issue about buses with different clock frequencies. Therefore, the question of how the transfer matrix connects buses with different clock frequencies is still not answered.

U.S. Patent Publication No. 20020162043 provides a structure for connecting an AHB and an advanced peripheral bus (APB) in the advanced microcontroller bus architecture (AMBA). In the structure, a master of the high-speed AHB can use a slave of the low-speed APB. The structure, however, cannot handle the situation where the slave is connected to high-speed buses. In addition, the structure can only be used in a two-bus system, but not in a system with more than two buses.

Accordingly, a more flexible solution is required to connect at least three buses with different clock frequencies and overcome the disadvantages of the prior art.

SUMMARY OF THE INVENTION

Accordingly, the present invention is directed to a method and an apparatus for connecting buses with different clock frequencies to overcome the disadvantages of the prior art and connect buses with different clock frequencies.

In order to achieve the object described above, the present invention discloses a method for connecting buses with different clock frequencies. The method comprises receiving a request, the request being transmitted from a master to a slave; if the clock frequency of the master is lower than that of the slave such that the slave sees more requests than the master does, masking redundant signal cycles of the request to prevent the slave from repeatedly receiving the request; transferring the request to the slave; if the clock frequency of the master is higher than that of the slave such that the slave cannot receive the request in time, lengthening the short signal of the request to synchronize the signal of the request and the clock signal of the slave; and transferring output data from the slave to the master.

In another aspect, the present invention is also directed to an apparatus for connecting buses with different clock frequencies. The apparatus is coupled to multiple buses, which comprise a receiving module, a masking logic module, an arbitration-transfer apparatus, a lengthening module, and a responsive module. The receiving module is coupled to the buses with masters, receiving and outputting a request, wherein the request is transmitted from a master to a slave. The masking logic module receives the request outputted from the receiving module. If the clock frequency of the master is lower than that of the slave such that the slave sees more requests than the master does, redundant signal cycles are masked to prevent the slave from repeatedly receiving the request and the masked request is outputted. The arbitration-transfer apparatus receives the request outputted from the receiving module, and the masked request outputted from the masking logic module, arranges an execution order for the requests, and outputs the masked requests according to the execution order. The lengthening module receives the request outputted from the arbitration-transfer apparatus. If the clock frequency of the master is higher than that of the slave such that the slave cannot receive the request in time, the short signal of the request is lengthened to synchronize the signal of the request and the clock signal of the slave, and the lengthened request is transferred to the slave. The responsive module receives an output data from the slave and transfers the output data to the master.

According to the embodiment of the present invention, in the method and the apparatus of the present invention, requests and responsive output data can be transmitted and received among multiple buses, and the clock cycles of the request signal can be masked or lengthened in accordance with the different clock frequencies of various busses. The object of the present invention is thus achieved. That is, the present invention is capable of connecting buses with different clock frequencies.

The above and other features of the present invention will be better understood from the following detailed description of the embodiments of the invention that is provided in conjunction with the accompanying drawings.

DESCRIPTION OF SOME EMBODIMENTS

The apparatus for connecting buses with different clock frequencies of the present invention is an improvement based on the prior art transfer matrix. The apparatus may be connected to any number of buses. Each bus may be connected to any number of masters and slaves. To simplify the interpretation, each embodiment described below is connected to two masters and two slaves, each of which occupies its own bus, as the structure described in FIG. 1.

Figure 1:
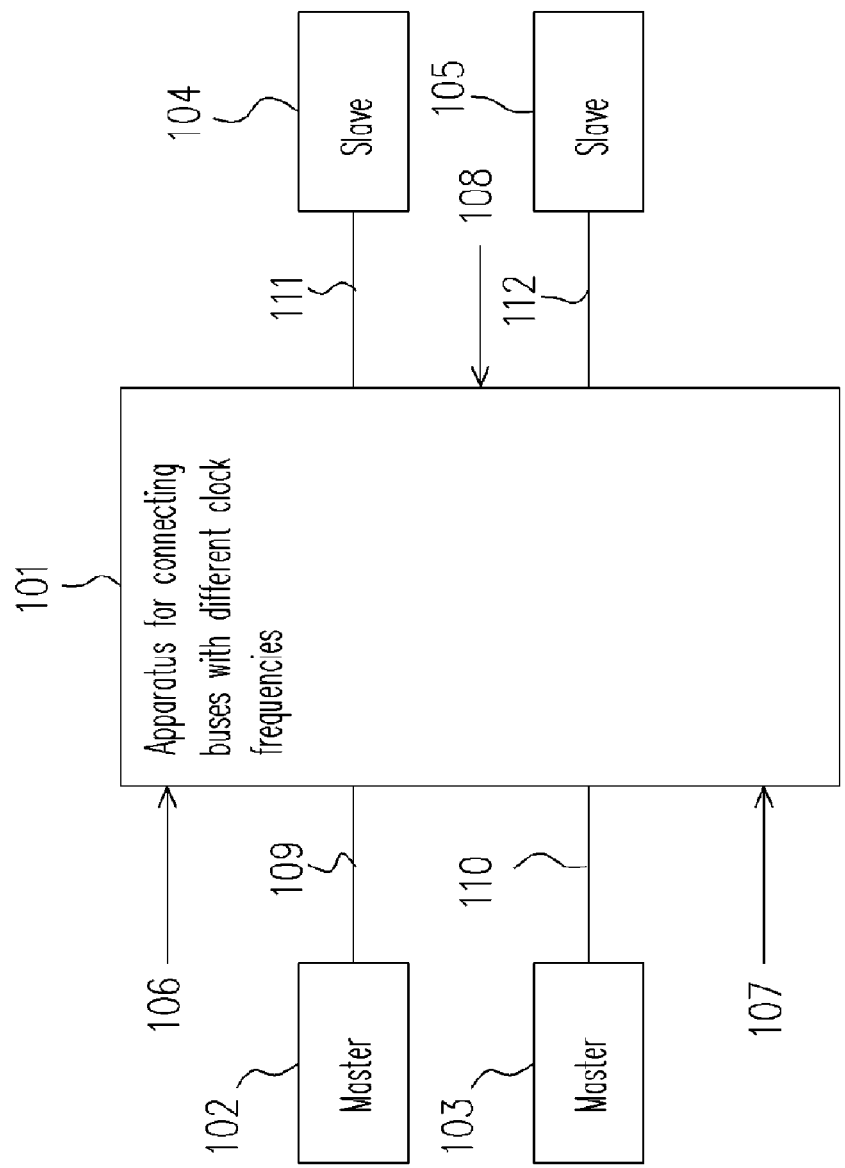
FIG. 1 is a schematic drawing showing an apparatus for connecting buses with different frequencies according to an embodiment of the present invention.

In FIG. 1, the apparatus 101 for connecting buses with different clock frequencies is connected with four buses 109–112. The master 102 is coupled to the bus 109, the master 103 is coupled to the bus 110, the slave 104 is coupled to the bus 111, and the slave 105 is coupled to the bus 112. In this embodiment, the buses 111 and 112 have high clock frequencies, and the buses 109 and 110 have low clock frequencies. The clock frequencies of the buses must have a multiple relationship. That is, the high clock frequencies should be N times as large as the low clock frequencies, wherein N is an integer.

In order to transfer requests and responses in the buses with different clock frequencies, the apparatus 101 for connecting buses with different clock frequencies should refer to different clock frequencies. The input signals 106, 107, and 108 are assigned for this purpose. Wherein the standard clock signal 108 is a clock signal having the highest frequency, which is commonly used by the apparatus 101 for connecting buses with different clock frequencies, and the buses 111 and 112. The signals 106 and 107 are originally intended to be clock signals used by the buses 109 and 110, respectively. Due to the complexity and difficulty in designing a circuit apparatus using clock signals with different frequencies, the signals 106 and 107 are actually clock enabling signals corresponding to the clock frequencies of the buses 109 and 110, respectively. These clock enabling signals can be externally provided or generated by the apparatus 101 for connecting buses with different clock frequencies according to the standard clock signal 108 which has the highest frequency.

Figure 2:
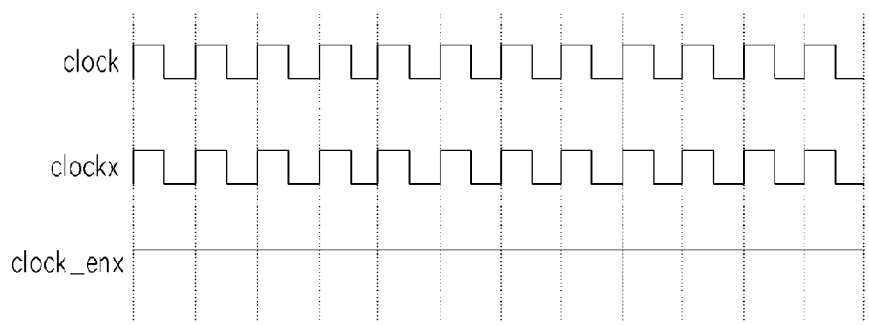
FIG. 2 is a configuration showing a sequential relationship among a standard clock signal clock, a bus clock signal clockx and a clock enabling signal clock_enx. The standard clock signal clock and the bus clock signal clockx have the same frequency such that the clock enabling signal clock_enx is always in a high voltage.
Figure 3:
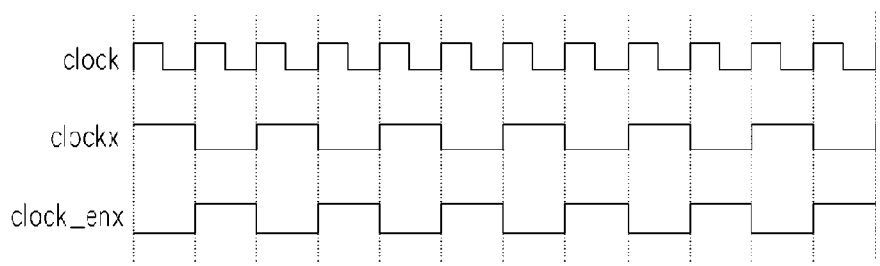
FIG. 3 is a sequential configuration similar to that of FIG. 2.
Figure 4:
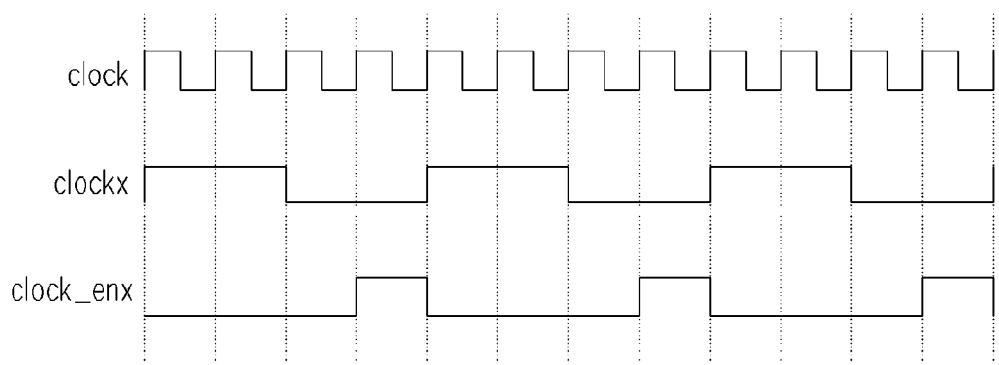
FIG. 4 is a sequential configuration similar to that of FIG. 2.

These clock enabling signals in the apparatus for connecting buses with different clock frequencies of the present invention are used to replace the bus clock signals. Accordingly, each of these clock enabling signals corresponds to one of the clock frequencies used by the buses. The clock enabling signals' varying frequencies are correlated to the standard clock signal, and usually are in a low voltage. Only when each cycle of the corresponding bus clock frequency ends does a high voltage which lasts for a standard clock cycle occur. Therefore, each clock enabling signal can replace all bus clock signals whose frequency is the same as the frequency the clock enabling signal corresponds to. FIG. 2 is a configuration showing a sequential relationship among a standard clock signal clock, a bus clock signal clockx and a clock enabling signal clock_enx. The standard clock signal clock and the bus clock signal clockx have the same frequency such that the clock enabling signal clock_enx are always in a high voltage. FIG. 3 is a sequential configuration similar to that of FIG. 2. The only difference is that the frequency of the standard clock signal clock is twice of that of the bus clock signal clockx, thus the clock enabling signal clock_enx only have a high voltage once every two cycles. That is, a high voltage occurs at the end of each cycle of the bus clock signal clockx. FIG. 4 is a sequential configuration similar to that of FIG. 2. Wherein, the frequency of the standard clock signal clock is four times of that of the bus clock signal clockx. From FIG. 4, a high voltage of the clock enabling signal clock_enx occurs once every four cycles. Accordingly, the situations with different multiple frequencies can be inferred from FIGS. 2–4.

Figure 5A:
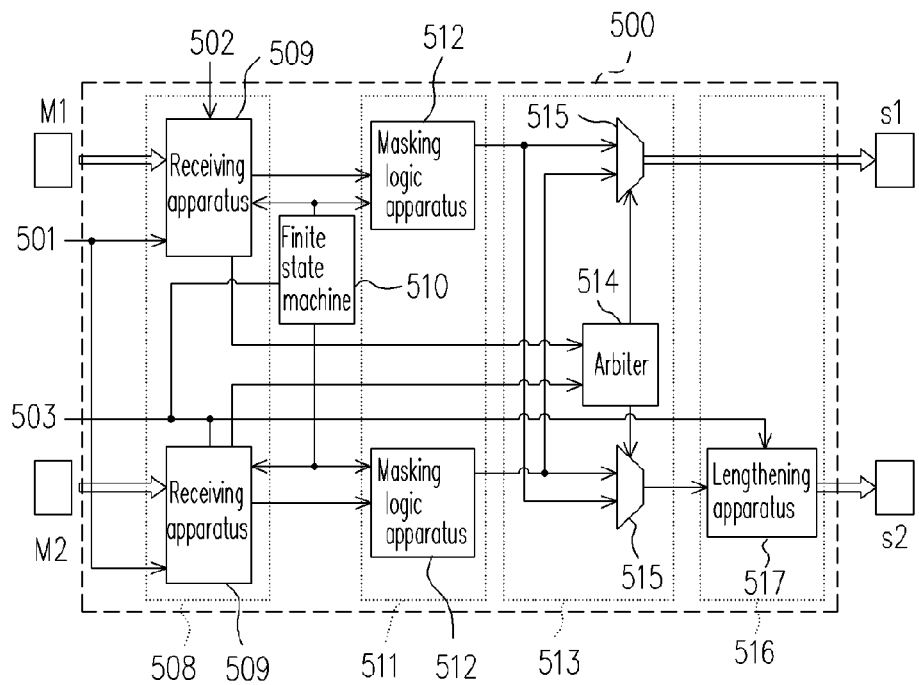
FIGS. 5A–5C are schematic drawings showing an apparatus for connecting buses with different clock frequencies according to an embodiment of the present invention.
Figures 5B, 5C:
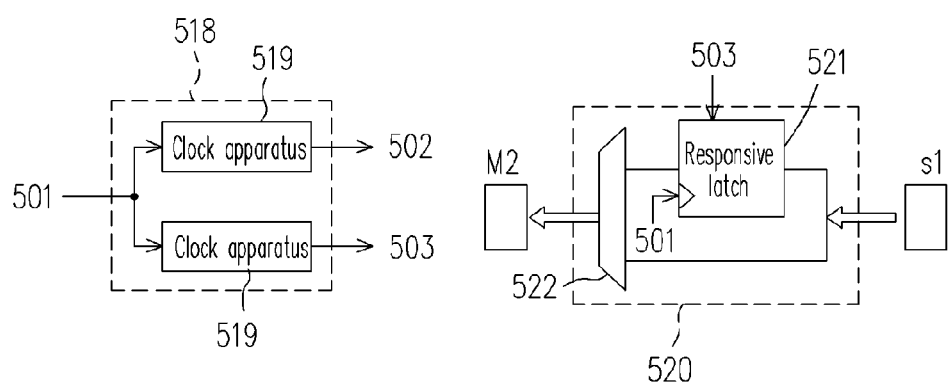

FIGS. 5A–5C are schematic drawings showing an apparatus for connecting buses with different clock frequencies according to another embodiment of the present invention. FIG. 5A illustrates the part which transfers the request from the master to the slave. In addition, the apparatus also includes the clock module 518 shown in FIG. 5B and the responsive module 520 shown in FIG. 5C. Wherein, the apparatus 500 for connecting buses with different clock frequencies is connected with two masters M1 and M2, and two slaves s1 and s2. Each of the masters and slaves has its own bus. In this embodiment, the clock frequency of the master M1 and slave s1 is twice of that of the master M2 and slave s2. The request from the masters M1 and M2 first enters the receiving module 508. The receiving apparatus 509 latches and decodes the request when the clock enabling signal is in a high voltage. Each bus comprising a master has a receiving apparatus 509 corresponding thereto, which receives the request outputted from the bus. The receiving apparatus 509 uses the standard clock signal 501 and uses the clock enabling signals 502 and 503 as the enabling signals to latch requests from the bus corresponding thereto.

The decoded request is then transmitted to the masking logic module 511. If the clock frequency of the master is lower than that of the slave such that the slave sees more requests than the master does, the masking logic apparatus 512 of the masking logic module 511 masks redundant signal cycles of the request lest that the slave repeatedly receive the request. Regarding masking the request, detailed descriptions are provided below.

After leaving the masking logic module 511, the request signal enters the arbitration-transfer apparatus 513. Here, if multiple requests are simultaneously transmitted to the same bus, the arbiter 514 arranges the sequence of these requests, sequentially outputting execution approval signals such that the corresponding transfer multiplexer 515 transmits the request with the highest priority in the sequence to the slave. The arbitration-transfer apparatus 513 only comprises one arbiter 514. Each transfer multiplexer 515 corresponds to one of the buses comprising the slaves.

Then the request signal is transmitted to the lengthening module 516. If the clock frequency of the master is higher than that of the slave such that the slave cannot receive the request signal in time. The corresponding lengthening apparatus 517 lengthens the request signal in order to synchronize the request signal and the clock signal of the slave. Accordingly, the slave is able to receive the request signal. Wherein, each lengthening apparatus 517 corresponds to one of the buses comprising the slave. In this embodiment, the slave s1 has the highest clock frequency, so the corresponding lengthening apparatus 517 is not required.

After leaving the lengthening module 516, the request signal enters the bus and is received by the slave s1 or s2. The finite state machine 510 is responsible for generating and outputting state signals to the receiving module 508 and the masking logic module 511 for the proper timing to latch and mask requests from the master.

FIG. 5B is a schematic drawing showing the clock module 518 and the clock apparatus 519 for generating clock enabling signals. As shown in this figure, each clock apparatus 519, according to the standard clock signal 501, generates a clock enabling signal (502 or 503 in FIG. 5B). Each of the clock apparatuses 519 corresponds to one of the clock frequencies used by the buses. As a matter of fact, it is easy to generate the clock enabling signals. For example, a simple counter can be used to generate the clock enabling signals. Accordingly, the apparatus 500 for connecting buses with different clock frequencies may do without the clock module 518. In such a case, the clock enabling signals are externally provided.

FIG. 5C is a schematic drawing showing the responsive module 520, which transmits the output data responding to the executed request from the slave to the master, the responsive latch 521 and the responsive multiplexer 522 of the responsive module 520. For a clear description, this embodiment in FIG. 5C merely includes a set of the responsive latch 521 and the responsive multiplexer 522 connected to the slave s1 and the master M2. In fact, each responsive latch 521 and each responsive multiplexer 522 correspond to one of the buses comprising the slaves. When the slave s1 generates output data, the output data are duplicated into two copies by the forking paths: one is latched by the responsive latch 521, and the other is transmitted to the responsive multiplexer 522. If the output data and the clock of the master M2 are synchronized, the responsive multiplexer 522 directly transmits the output data to the master M2. Otherwise, the responsive multiplexer 522 outputs the output data latched by the latch 521, and the output data will be received by the master M2 when the clocks are synchronized.

The following is a description of signal sequences as an example of how the requests and responses are transmitted in the buses with different clock frequencies in the present embodiments. In these embodiments, the bus signals and transfer protocols are pursuant to the advanced high-performance system bus (AHB) of the Advanced Microcontroller Bus Architecture (AMBA) provided by ARM Corp. Unless specifically defined, the clock frequency of the master, such as M2, in these embodiments, is half of that of the slave, such as s1 in FIG. 5A.

For a clear description, the table below includes explanations of all signals. Many bus signals are represented as Hxxxx_M or Hxxxx_s. They are the same signal, but appear in different locations. The signal with "_M" appears on the bus of the master, and the signal with "_s" appears on the bus of the slave. The following table explains all signals with the common names Hxxxx.

TABLE 1

Explanation of signals in FIGS. 6–11B

| Signal | Explanation |
|---|---|
| clock | Standard clock signal |
| clockx | Bus clock signal of the master |
| clock_enx | Clock enabling signal corresponding to bus clock frequency of the master |
| clocks | Bus clock signal of the slave |
| clock_ens | Clock enabling signal corresponding to bus clock frequency of the slave |
| HADDR | The address which the request will read from or write into. |
| HBURST | Whether the present request is a part of a burst. "single" means no; "INCR" means yes. |
| HRDATA | Output data responded from the slave after executing the read request |
| HREADY | High voltage means the bus is in an idle state; low voltage means the bus is in a busy state. |
| HTRANS | Types of the request. "nons" refers to a non-sequential request; that is, a single request or the first single request of a burst. "seq" represents a sequential request; that is, the single requests of a burst starting from the second request. "busy" represents the busy cycle. "idle" represents the idle cycle. "busy" and "idle", in this embodiment, are used to mask the redundant request signal cycles. The details of the masking are described below. |
| HWDATA | To-be-written data of the present request |
| HWRITE | High voltage means the present request is a write request; low voltage means the present request is a read request |

Figure 6:
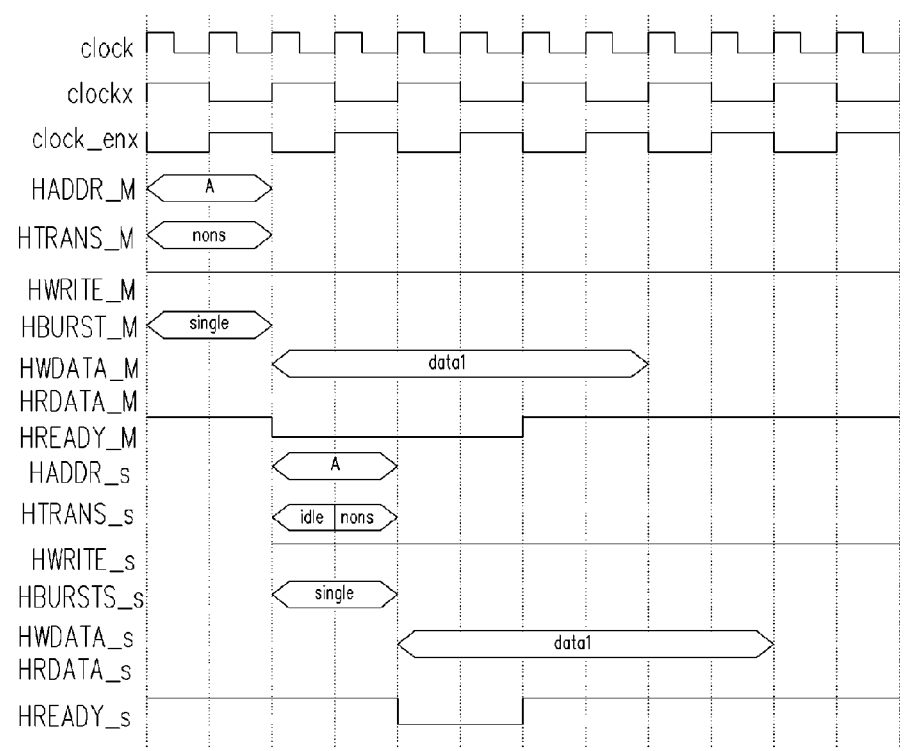
FIG. 6 is a configuration showing a signal sequence of transmitting a single write request by an apparatus for connecting buses with different clock frequencies according to an embodiment of the present invention.

Referring to FIG. 6, the signal first appears on the bus of the master. After a series of steps including latching, decoding and masking, the signal is then transmitted to the bus of the slave. In this embodiment, when the standard clock signal clock is on the rising edge and the clock enabling signal clock_enx is in a high voltage, the request from the master is latched. Except for the signal HTRANS, which will be masked, the other signals on these two buses are not changed. In this embodiment, the slave sees more requests than the master does because the clock frequency of the master is lower. As shown in this figure, this embodiment uses the idle cycle to mask the first cycle of the signal HTRANS, and leaves the second cycle intact. Accordingly, the slave only sees the second cycle of the signal HTRANS and will not receive multiple requests.

Figure 7:
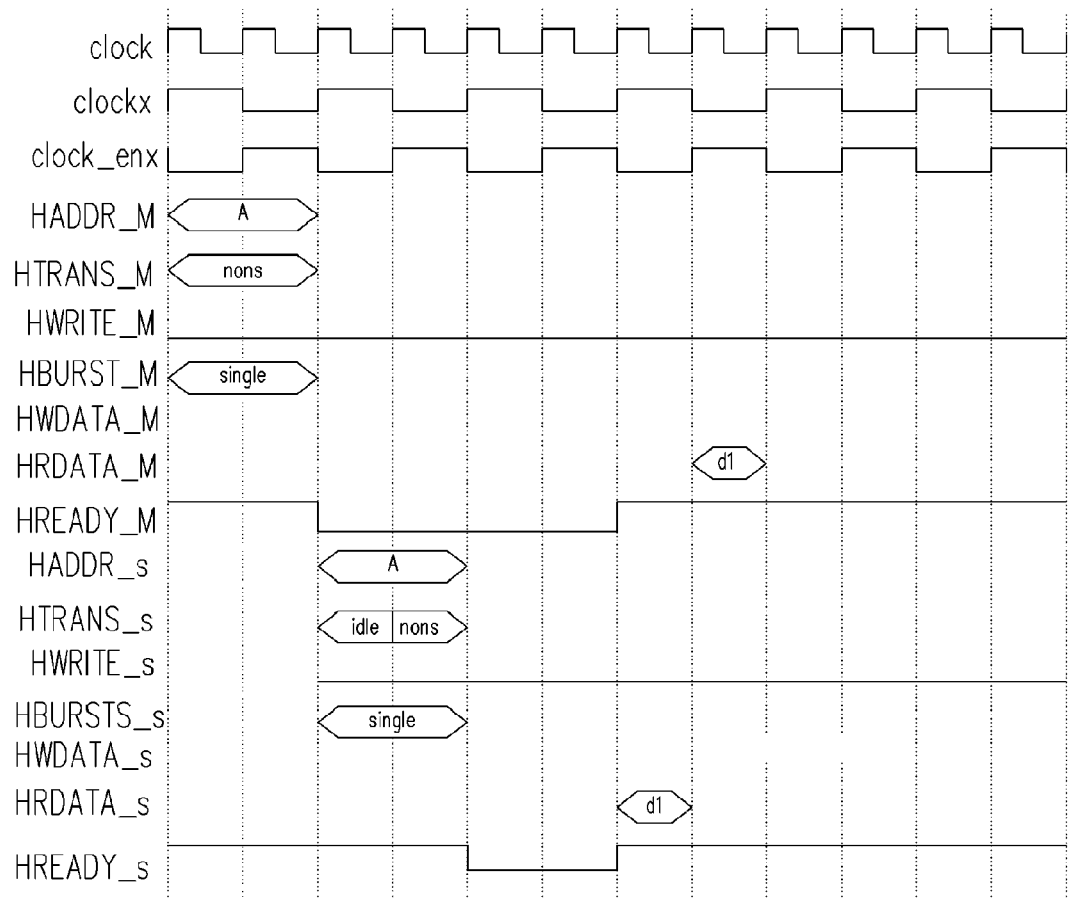
FIG. 7 is a configuration showing a signal sequence of transmitting a single read request by an apparatus for connecting buses with different clock frequencies according to an embodiment of the present invention.

FIG. 7 is a configuration showing a signal sequence of transmitting a single read request according to an embodiment of the present invention. In this embodiment, when the standard clock signal clock is on the rising edge, the HREADY_s is in a high voltage and the clock enabling signal clock_enx is in a low voltage, the output data d1 responded from the slave are latched and transferred to the bus of the master to be received by the master.

Figure 8:
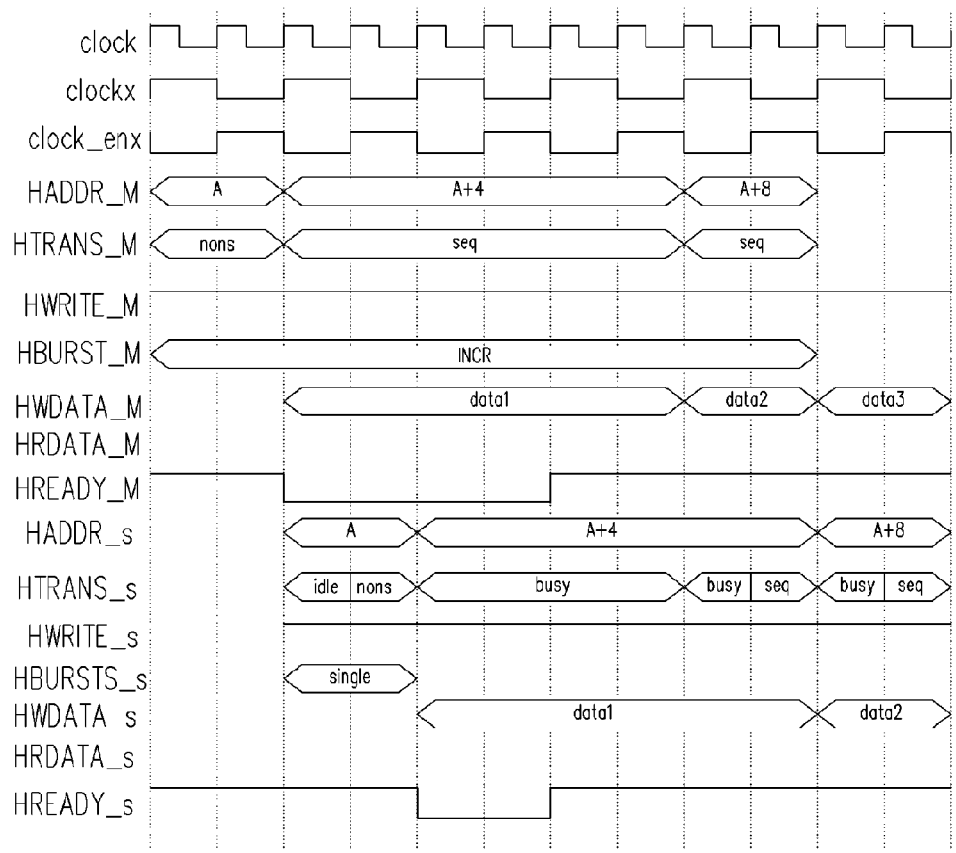
FIG. 8 is a configuration showing a signal sequence of transmitting a write burst by an apparatus for connecting buses with different clock frequencies according to an embodiment of the present invention.

FIG. 8 is a configuration showing a signal sequence of transmitting a write burst according to an embodiment of the present invention. A set of burst comprises multiple single requests. The write burst means the data are written into a sequence of addresses. In FIG. 8, the write burst comprises three write requests, wherein the first one is a non-sequential request (its HTRANS signal is non-sequential), and the others are sequential requests (their HTRANS signals are sequential). As shown in the figure, the masking of a burst is different from that for a single request. Wherein, the first request is masked with the idle cycle, and the others are masked with the busy cycle. The busy cycle is used because the idle cycle is not allowed in the sequential request based on the transfer protocol of AHB, otherwise the request will be considered as a non-sequential request, destroying the structure of the burst. After masking, only the last cycle of each HTRANS signal is valid. Accordingly, the slave will not repeatedly receive the request.

Figure 9:
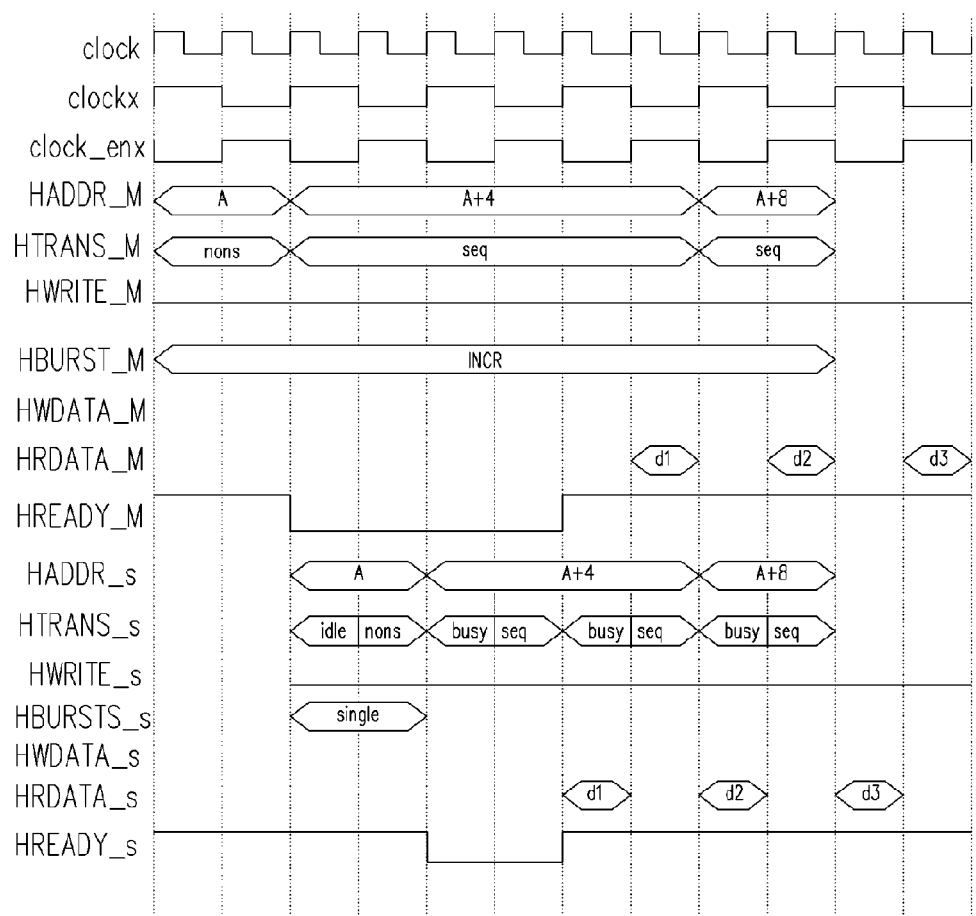
FIG. 9 is a configuration showing a signal sequence of transmitting read burst by an apparatus for connecting buses with different clock frequencies according to an embodiment of the present invention.

FIG. 9 is a configuration showing a signal sequence of transmitting read burst according to an embodiment of the present invention. The read burst means the data are read from a sequence of addresses. In FIG. 9, the read burst comprises three read requests. In this figure, three output data d1, d2 and d3 are sequentially latched and transferred to the bus of the master to be received by the master.

Figure 10:
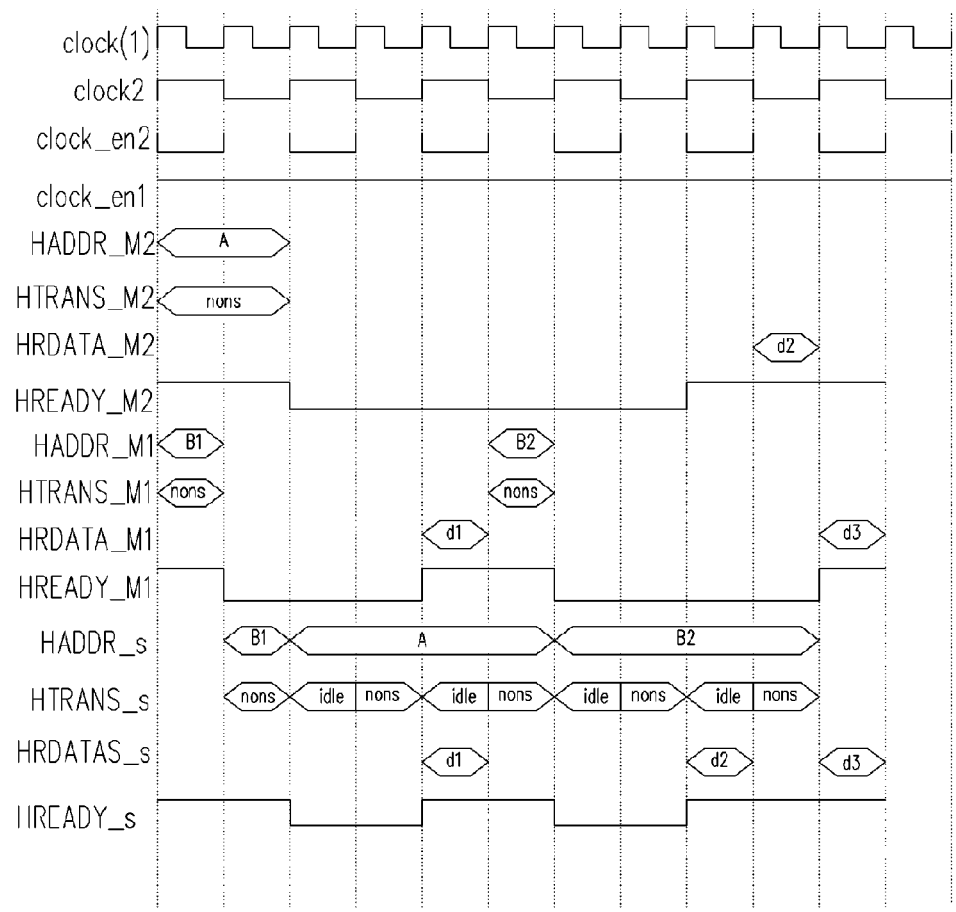
FIG. 10 is a configuration showing a signal sequence when two masters transmit requests to the same slave by an apparatus for connecting buses with different clock frequencies according to an embodiment of the present invention.

FIG. 10 is a configuration showing a signal sequence when two masters transmit requests to the same slave, wherein, clock1 and clock2 represent the bus clock signals of the first master and the second master, respectively, and clock_en1 and clock_en2 represent the clock enabling signals corresponding to the first master and the second master, respectively. The frequency of the first master, such as M1 in FIG. 5A, is equal to that of the slave, such as s1, in FIG. 5A. The frequency of the second master, such as M2 in FIG. 5A, is half of that of the slave, such as s1, in FIG. 5A. Regarding the bus signals, the signal with "_M1" is on the bus of the first master; the signal with "_M2" is on the bus of the second master.

Referring to FIG. 10, the arbitration-transfer apparatus, such as the arbitration-transfer apparatus 513 in FIG. 5A, arranges the sequence of the requests transmitted from these masters, and then sequentially transfer them to the bus of the slave. The output data responded from the slave after executing the request are transferred to the corresponding buses of the masters by the responsive module 520 in FIG. 5A.

Figure 11A:
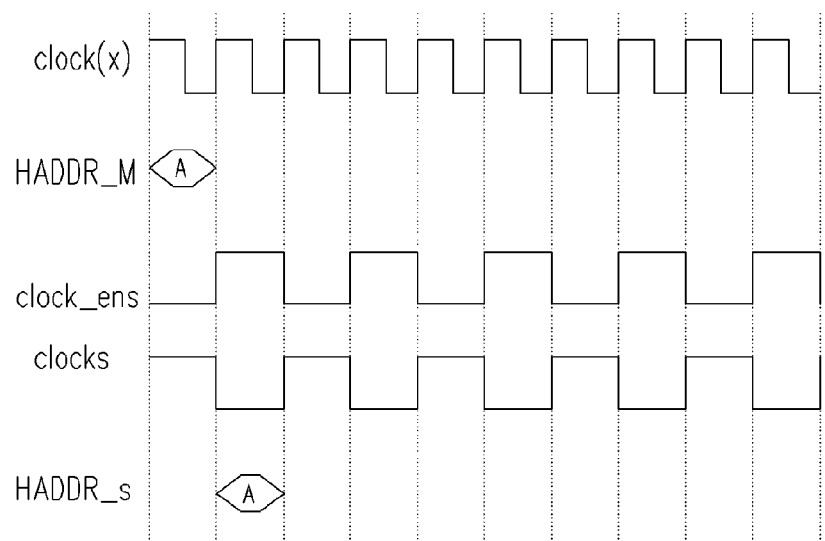
FIGS. 11A and 11B are configurations showing signal sequences of lengthening a request signal by an apparatus for connecting buses with different clock frequencies according to an embodiment of the present invention.
Figure 11B:
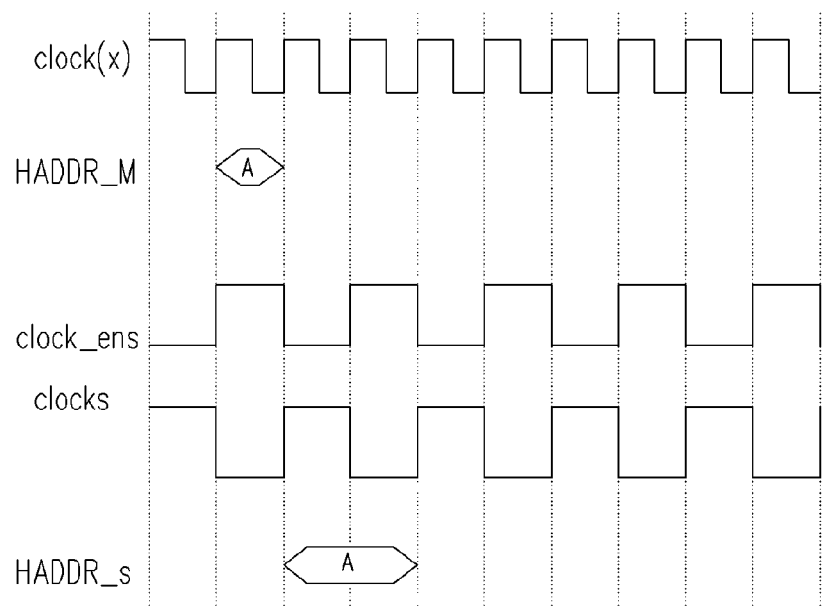

In these embodiments described above, the clock frequency of the master is not higher than that of the slave. FIGS. 11A and 11B show an embodiment in which the clock frequency of the master is higher than that of the slave. In these figures, the clock frequency of the master, such as M1 in FIG. 5A, is twice of that of the slave, such as s2 in FIG. 5A. In order for the slave to receive the request, the request should be lengthened such that the lengthened request and the clock frequency of the slave are synchronized. FIG. 11A shows the situation where the request signal needs not to be lengthened. By contrast, FIG. 11B shows the situation where the request signal needs to be lengthened. In this embodiment, the lengthening means that the request signal is delayed for a cycle and lengthened to doubled duration such that the length of the request signal is equal to the clock cycle of the slave, and is synchronized with the clock cycle of the slave.

Figure 12:
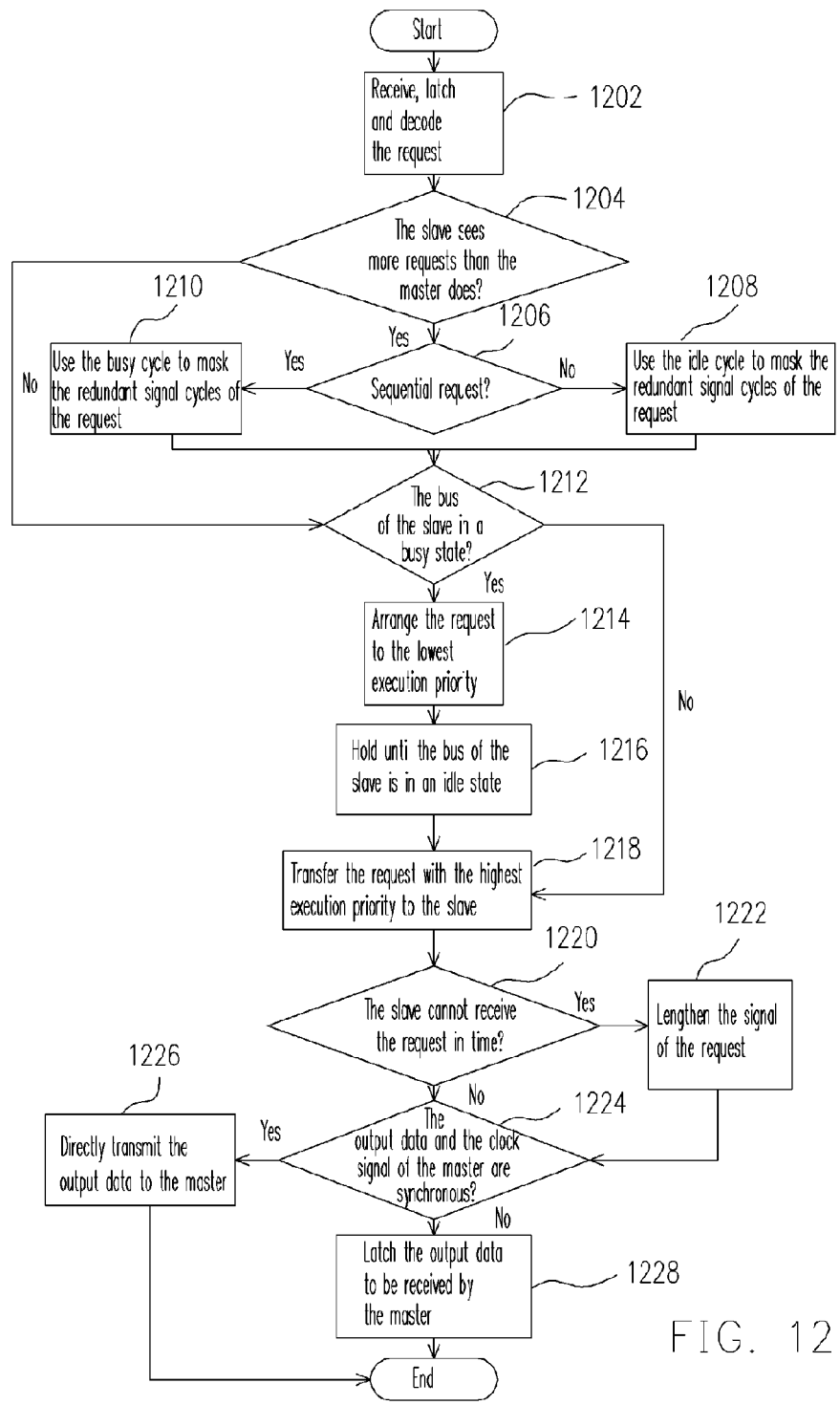
FIG. 12 is a flowchart showing a method of connecting buses with different clock frequencies according to an embodiment of the present invention.

FIG. 12 is a flowchart showing a method of connecting buses with different clock frequencies according to an embodiment of the present invention.

Referring to FIG. 12, in step 1202, the request from the master is received, latched and decoded for subsequent procedure. The step 1204 determines whether the slave sees more requests than the master does such that the slave will receive repeated requests. If not, the process goes to step 1212. If yes, in step 1206, it is further determined whether the request is a sequential request. If not, in step 1208, the idle cycle masks the redundant signal cycles of the request lest the slave repeatedly receive the request. If yes, in step 1210, the busy cycle masks the redundant signal cycles of the request.

Then in step 1212, it is determined whether the bus of the slave is in the busy state. If not, the process goes to step 1218. If yes, in step 1214, the present request is arranged to the lowest execution priority. In step 1216, the process is on hold until the bus of the slave is in an idle state. In step 1218, the request with the highest execution priority is transferred to the slave when the clock signals of the master and the slave are synchronous. The steps 1212–1218 are meant to determine the sequence of the requests to be transmitted to the same bus, and sequentially transfer the requests to the slave for execution.

Before the requests are received by the slave, in step 1220, it is first determined whether the clock frequency of the master is higher than that of the slave such that the slave cannot receive the request in time. If yes, in step 1222, the short signal of the request is lengthened such that the slave can receive the request. The slave then receives and executes the request. Next, in step 1224, it is determined whether the output data responded from the slave after executing the requests and the clock signal of the master are synchronous. If yes, in step 1226, the output data are directly transmitted to the master. If not, in step 1228, the output data are latched to be received by the master when the clock signal of the master is synchronous with the output data.

Accordingly, the method and apparatus for connecting buses with different clock frequencies in the present invention is able to overcome the disadvantages of prior art technology and connect multiple buses with different clock frequencies.

Although the present invention has been described in terms of exemplary embodiments, it is not limited thereto. Rather, the appended claims should be constructed broadly to include other variants and embodiments of the invention which may be made by those skilled in the field of this art without departing from the scope and range of equivalents of the invention.

What is claimed is:

1. A method for connecting buses with different clock frequencies, comprising:

(a) receiving a request, wherein the request is transmitted from a master to a slave;

(b) if the clock frequency of the master is lower than that of the slave such that the slave sees more requests than the master does, masking redundant signal cycles of the request to prevent the slave from repeatedly receiving the request;

(c) transferring the request to the slave while clock signals of the master and the slave are synchronous, if the bus of the slave is in a busy state, setting the execution priority of the request to the lowest priority; and after the bus of the slave is in an idle state, transferring the request with the highest execution priority to the slave;

(d) if the clock frequency of the master is higher than that of the slave such that the slave cannot receive the request in time, lengthening the request to synchronize the signal of the request and a clock signal of the slave; and (e) transferring output data responded from the slave to the master.

2. The method for connecting buses with different clock frequencies of claim 1, wherein the step (a) further comprises:
   latching the request; and
   decoding the request.

3. The method for connecting buses with different clock frequencies of claim 1, wherein the step (b) further comprises:
   if the request is a non-sequential request, masking the request with an idle cycle; and
   if the request is a sequential request, masking the request with a busy cycle.

4. The method for connecting buses with different clock frequencies of claim 1, wherein the step (e) further comprises:
   if the output data and the clock signal of the master are synchronous, directly transmitting the output data to the master; and
   if the output data and the clock signal of the master are not synchronous, latching the output data to be received by the master.

5. An apparatus for connecting buses with different frequencies, coupled among a plurality of buses, comprising:
   a receiving module, coupled to the buses with masters, receiving and outputting a request, wherein the request is transmitted from a master to a slave;
   a masking logic module, receiving the request outputted from the receiving module, if the clock frequency of the master is lower than that of the slave such that the slave sees more requests than the master does, masking redundant signal cycles of the request to prevent the slave from repeatedly receiving the request, and outputting the masked request;
   an arbitration-transfer apparatus, receiving the request outputted from the receiving module and the masked request outputted from the masking logic module, arranging an execution sequence of the requests to be transmitted to the same bus, outputting the masked requests according to the execution sequence;
   a lengthening module, receiving the request outputted from the arbitration-transfer apparatus, if the clock frequency of the master is higher than that of the slave such that the slave cannot receive the request in time, lengthening the signal of the request to synchronize the signal of the request and the clock signal of the slave, transferring the lengthened request to the slave; and
   a responsive module, receiving an output data responded from the slave and transferring the output data to the master, wherein the responsive module further comprises:
   one or more responsive latches, individually corresponding to one of the buses comprising the slaves, receiving the output data from the corresponding bus, latching and outputting the output data; and
   one or more responsive multiplexers, individually corresponding to one of the responsive latches, receiving the output data from the responsive latch and the bus corresponding to the responsive latch, and transferring the output data to the master.

6. The apparatus of claim 5, further comprising:
   a clock module, receiving a standard clock signal, generating a clock enabling signal for each of the clock frequencies of the buses to replace the clock signals of the buses, and outputting the clock enabling signals to the receiving module and the lengthening module.

7. The apparatus of claim 5, wherein the receiving module further comprises:
   one or more receiving apparatuses, individually corresponding to one of the buses comprising the masters, latching the request from the bus, decoding the request, outputting the decoded request to the masking logic module and the arbitration-transfer module.

8. The apparatus of claim 5, wherein when the masking logic module masks the request, if the request is a non-sequential request, mask the request with an idle cycle, and if the request is a sequential request, mask the request with a busy cycle.

9. The apparatus of claim 5, wherein the masking logic module further comprises:
   one or more masking logic apparatuses, coupled between the receiving module and the arbitration-transfer apparatus, individually corresponding to one of the buses comprising the masters, receiving the request outputted by the receiving module and from the bus, executing the masking function of the masking logic module, and outputting the masked request to the arbitration-transfer apparatus.

10. The apparatus of claim 5, wherein the arbitration-transfer apparatus further comprises:
    an arbiter, receiving the request outputted from the receiving module, arranging an execution sequence for the requests to be transmitted to the same bus, outputting an execution approval signal; and
    one or more transfer multiplexers, individually corresponding to one of the buses comprising the slaves, receiving the execution approval signal outputted from the arbiter and the request outputted from the masking logic module, and outputting the request to the lengthening module according to the execution sequence arranged by the arbiter.

11. The apparatus of claim 5, wherein the lengthening module further comprises:
    one or more lengthening apparatuses, individually corresponding to one of the buses comprising the slaves, receiving the request transmitted from the arbitration-transfer apparatus to the bus, executing the lengthening function of the lengthening apparatus, and outputting the lengthened request to the corresponding bus.

12. The apparatus of claim 6, wherein the frequency of the standard clock signal is equal to the highest frequency among the clock frequencies of the buses.

13. The apparatus of claim 12, wherein the varying frequencies of the clock enabling signals are correlated to the standard clock signal, and each of the clock enabling signals have only one cycle of high voltage at the end of each cycle of the corresponding clock frequency, and the other cycles are low voltage.

14. The apparatus of claim 6, wherein the clock module further comprises:
    one or more clock apparatuses, coupled between the input terminal and the output terminal of the clock module, individually corresponding to one of the clock frequencies of the buses, receiving the standard clock signal, generating and outputting the clock enabling signal corresponding to the clock frequency.

* * * * *